United States Patent
Hodge

[15] 3,697,548
[45] Oct. 10, 1972

[54] ZEARALENONE REDUCTION
[72] Inventor: Edward B. Hodge, Terre Haute, Ind.
[73] Assignee: Commercial Solvents Corporation
[22] Filed: April 2, 1970
[21] Appl. No.: 25,265

[52] U.S. Cl. .................................. 260/343.2 F
[51] Int. Cl. ................................. C07d 9/00
[58] Field of Search ..................... 260/343.2 F

[56] References Cited

UNITED STATES PATENTS 3,239,345  3/1966  Hodge et al. ......... 260/343.2 X

OTHER PUBLICATIONS

Urry et al., Tetrahedron Letters, pp. 3109–14 (1966)

*Primary Examiner*—John M. Ford
*Attorney*—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland

[57] ABSTRACT

A method for reducing zearalenone to zearalanol in which the product contains a major amount of the high melting diastereoisomer and a minor amount of the low melting diastereoisomer of zearalanol is disclosed. Zearalenone is catalytically reduced with hydrogen in the presence of a solvent, a strong acid, and a platinum catalyst for a time sufficient to reduce the zearalenone to zearalanol.

9 Claims, No Drawings

ZEARALENONE REDUCTION

This invention relates to a method for reducing zearalenone to a mixture of the high- and low-melting point diastereoisomers of zearalanol.

The terms "zearalenone" and "zearalanol" conform with the nomenclature in an article in *Tetrahedron Letters*, Pergamon Press, Ltd., No. 27, pp. 3109-3114 (1966). When zearalenone, having the formula

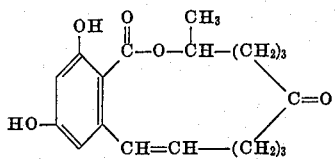

is converted to zearalanol, having the formula

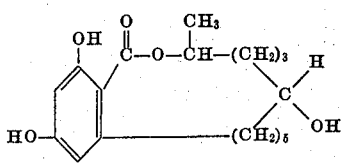

by reduction of the olefinic bond and the ketone group in the presence of hydrogen, a mixture of diastereoisomers of zearalanol is formed. This reduction, carried out in the presence of a Raney nickel catalyst, is disclosed in U.S. Pat. No. 3,239,345. The diastereoisomers differ in melting point. The disclosed reduction provides an approximately 55:45 ratio of the high-melting point to the low-melting point diastereoisomer. The reduction, when carried out in the presence of an aqueous base, as disclosed in the aforesaid *Tetrahedron Letters* article, changes the ratio of the diastereoisomers obtained to about 35:65 of the high melting point to the low melting point diastereoisomer.

The product can be separated utilizing a procedure disclosed in Examples I and II of co-pending application Serial No. 643,819, now U.S. Pat. No. 3,574,235 filed June 6, 1967, in the name of Vernon V. Young, now U.S. Pat. No. 3,574,235. Both diastereoisomers of zearalanol are useful as anabolic and esterogenic substances for oral and parenteral administration to animals in the manner disclosed in U.S. Pat. No. 3,239,345.

A method has now been found for catalytically reducing zearalenone to a mixture containing a major amount, e.g., greater than 55 weight percent, for example, about 60 weight percent or more, of the diastereoisomer of zearalanol having the higher melting point and a minor amount, e.g., less than 45 weight percent, for example, about 40 weight percent or less, of the diastereoisomer of zearalanol having the lower melting point.

In accordance with the present invention, the reduction of zearalenone is conducted in the presence of a solvent, a strong acid, and a platinum catalyst to increase the ratio of the high melting point diastereoisomer to the low melting point diastereoisomer.

The zearalenone can be prepared and purified as described in Examples II and III of U.S. Pat. No. 3,239,345. The zearalenone is advantageously suspended or dissolved in a suitable solvent, preferably a lower alkanol, e.g., ethanol, normal propyl alcohol, isopropyl alcohol and the like, preferably those containing from one to three carbon atoms and particularly ethanol. A small amount, e.g., about 0.001 to 5 volume percent (based on the solvent), preferably from about 0.01 to 3 volume percent or equivalent weight, of a strong acid (i.e., an acid that is practically completely ionized in solution) is added. Suitable examples of strong acids include concentrated solutions of a mineral acid such as hydrochloric acid or sulfuric acid, p-toluene sulfonic acid, perchloric acid, trifluoroacetic acid, hydrobromic acid and the like. A weak acid, e.g., acetic acid, was found unsatisfactory. When using 96 percent sulfuric acid with methanol solvent, it has been found advantageous to add a small amount of water, for instance from about 1 to 20 volume percent, preferably 2 to 10 volume percent based on the methanol.

The zearalenone and solvent can advantageously be present in amounts of, for example, from about 1 to 25 grams of zearalenone per 100 cc. of the solvent. A platinum catalyst supported on a suitable carrier, e.g., charcoal is advantageously used. Generally, the catalyst contains from about 0.01 to about 10 weight percent, preferably from about 1 to 10 weight percent, of platinum and is employed in catalytic amounts, generally a catalyst to zearalenone weight ratio of from about 0.001:1 to 1:1.

The zearalenone is reduced in the presence of hydrogen under reducing conditions for a time sufficient to reduce substantially all of the zearalenone. Advantageously, the reduction can be carried out at a temperature of from about 15° to 100° C., preferably about 20° to 60° C., with a hydrogen pressure generally of from about 20 to 1000 p.s.i., preferably 25 to 100 p.s.i., for about 3 to 5 hours. After the reduction, the platinum catalyst is removed from the reaction mixture, e.g., by filtration, and the resulting mixture can, as a matter of convenience, be concentrated, to say, a volume of from about 0.5 to 0.1 of the reaction mixture volume, and filtered again. The filtered, concentrated solution can be diluted with water, for example, in an amount of from about 2 to 4 volumes of the concentrated solution, by adding water slowly while stirring the solution. The resulting solution is advantageously allowed to stand at room temperature for a time sufficient to allow the zearalanol to precipitate from the solution which can be about 2 to 4 hours or more. Filtration of the mixture yields the white crystals of zearalanol containing a major amount of the high melting diastereoisomer and minor amount of the low melting diastereoisomer which can be separated as noted above.

The invention shall be illustrated with the following Examples.

EXAMPLE I

Three grams (g.) of zearalenone and 1 cc. conc. (e.g., 37 percent) HCl were added to 150 cc. of ethanol at room temperature, and, after flushing with nitrogen, 0.8 g. of a 5 percent platinum on charcoal catalyst was added. The solution was charged into an Adams reducing apparatus and reduced with hydrogen for 4 hours at room temperature under a hydrogen pressure of 50 p.s.i. The resulting reduced mixture was filtered, concentrated to 50 ml. and filtered again. Then, 150 ml. of water were added to the mixture slowly with stirring. After 3 hours at room temperature, the mixture was filtered to give 2.75 g. of zearalanol which was analyzed to be about 72 percent of the high melting diastereoisomer and 28 percent of the low melting diastereoisomer.

EXAMPLES II to IX

The following examples are conducted in essentially the same manner as employed in Example I except the solvents and acids set forth for the given Example are used:

| Example | Solvent | Strong Acid |
|---------|---------|-------------|
| II | ethanol | p-tol. sulfonic |
| III | ethanol | 96% $H_2SO_4$ |
| IV | ethanol | perchloric |
| V | ethanol | trifluoroacetic |
| VI | methanol | HCl |
| VII | methanol | 96% $H_2SO_4$ + 5 vol. % $H_2O$ (based on methanol) |
| VIII | isopropanol | HCl |
| IX | n-propanol | 96% $H_2SO_4$ |

It is claimed:

1. A method for reducing zearalenone to a mixture of a major amount of the high melting point diastereoisomer and a minor amount of the low melting point diastereoisomer of zearalanol comprising catalytically reducing the zearalenone with hydrogen under reducing conditions in the presence of a solvent consisting essentially of a lower alkanol solvent containing from about 0.001 to 5 volume percent (based on the solvent) of a strong acid and catalytic amounts of platinum catalyst.

2. The method of claim 1 wherein the reducing conditions include temperatures from about 15° to 100°C. and a hydrogen pressure from about 20 to 1000 p.s.i. and the catalyst is employed in a catalyst to zearalenone weight ratio from about 0.001:1 to 1:1.

3. The method of claim 2 wherein the strong acid is selected from the group consisting of hydrochloric acid, sulfuric acid, p-toluene sulfonic acid, perchloric acid, and trifluoroacetic acid and the zearalenone is employed in an amount of about 1 to 25 grams per 100 cc. of solvent.

4. The method of claim 2 wherein the lower alkanol contains from one to three carbon atoms.

5. The method of claim 2 wherein the lower alkanol is ethanol, the acid is concentrated hydrochloric acid, and the platinum is supported on charcoal in an amount from about 0.01 to 10 weight percent.

6. The method of claim 5 wherein the catalytic reaction is carried out with reducing conditions including temperatures from about 20° to 60°C. and a hydrogen pressure from about 25 to 100 p.s.i.

7. The method of claim 6 wherein the solvent contains the acid in an amount from about 0.01 to 3 volume percent, based on the volume of the solvent.

8. The method of claim 2 wherein the lower alkanol is methanol, the acid is concentrated sulfuric acid, and the reduction is conducted in the presence of water in an amount of about 1 to 20 volume percent based on the methanol.

9. The method of claim 8 wherein the reduction is conducted in the presence of water in an amount of about 2 to 10 volume percent.

* * * * *